United States Patent Office 2,935,510
Patented May 3, 1960

2,935,510

PREPARATION OF STARCH DERIVATIVES

Otto B. Wurzburg, Whitehouse Station, N.J., assignor to National Starch and Chemical Corporation No Drawing. Application June 6, 1958
Serial No. 740,195

8 Claims. (Cl. 260—233.3)

This invention relates to a method for making new starch derivatives characterized by improved resistance of their aqueous dispersions to loss of hydrating capacity, clarity and texture, upon aging at low temperatures or upon repeated freezing and thawing. It relates further to the starch derivatives thus produced.

It is my particular object to make such products from tuber, root and root-type starches, such for example as those derived from tapioca, potato, waxy maize and waxy sorghum. Although the two are not actually root starches, they are ordinarily classed as root-type, because many of their properties correspond to those of the true root starches.

Starches generally fall into two broad classes, one comprising cereal starches (cornstarch being the prime example) and the other class comprising the tuber, root or root-type starches. It will be understood that whenever I speak herein of any one of the three last-named types I refer to the class as a whole.

Cereal starch (e.g., corn) when cooked in water and cooled, tends to become opaque and set to a gel or pasty mass. On the other hand, when a root starch is similarly cooked and cooled, the dispersion ordinarily retains its viscosity, clarity and texture to a far greater degree. This resistance to loss of clarity and change in viscosity is referred to as "stability." Because of this stability the root starches are preferred for many applications, including food preparations, thickeners and the like.

Suprisingly, it has been found that dispersions of even the root starches, in spite of their known stability, develop undesirable properties under certain conditions, and more specifically under conditions of prolonged exposure to low temperature. Aqueous dispersions of starches must often be used in conditions which involve long storage at relatively low temperatures, or subjection to repeated freezing and thawing cycles. Thus, starch dispersions are used in fruit pie fillings (which are frequently canned) as well as in a number of frozen foods, as in frozen pies, soups and the like. In the case of canned fruit pie fillings, these are often stored in warehouses which have no heating facilities, and therefore may be at very low temperatures for prolonged periods. In the case of the frozen foods, they sometimes undergo repeated thawing and freezing cycles. Under these circumstances of low temperature, the so-called "stable" root-type starches, undergo a strange phenomenon. There is a distinct loss in hydrating power of the starch, resulting in syneresis, or an exhudation of liquid, together with a marked deterioration in texture and clarity. This can hardly be equivalent to what happens with a cereal starch such as corn, where linear amylose is the predominating fraction, and where one would expect an association of the linear molecules. Obviously, syneresis and deterioration of texture and clarity in cold-stored or frozen foods is a serious commercial disadvantage.

I have now discovered a method for treating root-type starches, such as waxy maize, tapioca and waxy sorghum, so that they do not exhibit the above-described disadvantages even under conditions of prolonged cold or repeated freezing-thawing cycles.

My process involves a combination of two chemical reactions upon the starch. One reaction is the treatment of the starch with a polyfunctional etherification or esterification reagent, which results in a bridging or cross-linking of the hydroxyl groups in the starch granule. The other reaction is the acylation of the starch with acetic or propionic anhydride.

The starch product obtained by the above-mentioned combination of treatments is characterized by notably improved resistance to loss of hydrating power, clarity and texture upon exposure to prolonged storage at low temperatures or upon subjection to repeated freezing-thawing cycles.

A detailed description of the process, including materials, procedures and proportions is given below.

MATERIALS

The starch, as previously stated, must be a tuber, root or root-type starch. In practice this would ordinarily involve the use of tapioca, potato, waxy maize or waxy sorghum starch.

The cross-linking reagent may be any chemical containing two or more functional groups capable of reacting with at least two of the hydroxyl groups of the starch molecule, and thus causing a linking or bridging of said groups. Such a polyfunctional cross-linking reagent would ordinarily react with the starch through an etherification or an esterification reaction. Epichlorohydrin is an example of a cross-linking etherification reagent, whereas representative examples of cross-linking esterification reagents include phosphorous oxychloride, dibasic polyfunctional acids such as citric or adipic acids, and particularly the mixed anhydrides of such dibasic acids with acetic anhydride or propionic anhydride. Since all of these, when reacted with starch in the ungelatinized granule form, result in a cross-linking of the hydroxyl groups in the starch granule, I shall for purposes of brevity refer to them, as a class, as "cross-linking reagents," this class being divided into cross-linking etherification reagents and cross-linking esterification reagents.

Besides the bridging or cross-linking reaction, the starch is also acylated with either acetic anhydride or with propionic anhydride, this, of course, also comprising an esterification reaction. The reaction with either of these anhydrides preferably follows the cross-linking reaction. In some cases, however, the order of the two reactions may be reversed if desired, or they may occur simultaneously as when the cross-linking is accomplished by means of a mixed or linear polybasic anhydride.

PROCEDURE

The starch may be suspended in water which has been made alkaline by the addition of an alkali metal hydroxide or any other water-soluble base (as for example sodium carbonate or calcium hydroxide). Alternatively, starch may be added to water and the alkali may be added subsequently.

There is then added the cross-linking etherification or esterification reagent. If one employs an etherification reagent, then the pH should be maintained within the approximate range 9–12 during the reaction, and preferably about pH 11. If an esterification reagent is used, a pH within the approximate range 7–10.5 is preferred. Depending upon the reactivity of the chemical, reaction may be instantaneous or it may be necessary to maintain agitation for up to 24 hours. Room temperature is ordinarily sufficient, although mild heating (say from 70° to 100° F.) tends to speed the reaction. At the conclusion of the reaction the starch may be filtered and washed, if desired, and resuspended in water.

The pH of the suspension is then adjusted to about 5–11, and the acetic or propionic anhydride is added in small proportions. Since this too is an esterification reaction the pH should preferably be maintained within the range 7–10.5, as indicated above for the cross-linking esterification reaction. The starch product is then filtered, washed with water and dried.

If the cross-linking agent employed is a mixed anhydride, such as results from reacting a polybasic acid such as citric or adipic acid with acetic or propionic anhydride, then the cross-linking and the acylation reaction takes place simultaneously, provided that an excess of said acetic or propionic anhydride is present. This being an esterification reaction, the preferred pH during the reaction is 7–10.5.

Since both esterification and etherification reactions are facilitated by alkaline conditions, it has already been indicated that the pH of the reaction mass during the cross-linking as well as the acetic or propionic anhydride reactions should preferably be alkaline. However, in any case, it is important that the pH both during the cross-linking and the acetylation reactions, be below the point at which the starch will gelatinize and lose its original granular, discrete structure. It is well known that starch, in the presence of water, will gelatinize and have its granular structure disrupted if the degree of alkalinity or the temperature rises beyond a certain point. The particular degree of alkalinity or temperature necessary to gelatinize starch varies with each starch type (e.g., corn starch, waxy maize, tapioca, potato, etc.) but it is a simple matter for the practitioner in the art to avoid those conditions which would bring about gelatinization of the particular starch.

PROPORTIONS

In order for the final product to achieve its remarkable resistance to deterioration upon exposure to prolonged cold, it is important that the amount of polyfunctional cross-linking reagent with which the starch is treated, as well as the amount of acylating reagent (acetic or propionic anhydride), and the ratio of cross-linking agent to acylating reagent, be kept within definite limits. Thus, the amount of polyfunctional cross-linking agent with which the starch is treated should be within the range 0.05% to 1.0% by weight, based on the dry weight of the starch. Within this range, I prefer in most cases to employ from 0.05% to 0.2%. The amount of acetic or propionic anhydride (or equivalent) with which the starch is treated should fall within the range 4% to 10% by weight, based on the dry weight of the starch, the preferred amount being 4 to 6%. The ratio of polyfunctional cross-linking agent to the acylating reagent (acetic or propionic anhydride) should be within the ratio 1:10 to 1:100, by weight, it being remembered that one should not in any case use substantially more than the amounts of each of the chemicals herein indicated.

The following examples will illustrate several embodiments of my invention.

Example I

In this, as well as in the subsequent examples, all parts are given by weight.

100 parts of waxy maize starch were suspended in 150 parts water, in which 0.8 part of sodium hydroxide had been dissolved. 0.05 part of epichlorohydrin was slowly added, and the slurry was maintained, with agitation, at 70°–80° F. for 16 hours.

The reaction mixture was then adjusted with hydrochloric acid to pH 8, and 4 parts of propionic anhydride were slowly added, in small portions. The pH was maintained at 8 during the addition of the anhydride by simultaneous additions of a 2.5% aqueous solution of sodium hydroxide. After all of the propionic anhydride was added, the pH was adjusted with hydrochloric acid to 5.0, and the starch was filtered, washed thoroughly with water and dried.

In order to test the product, 7.5 grams were mixed in 50 ml. of water, and 50 ml. of cranberry juice were added. The mixture was cooked for 10 minutes at 190° F., and 15 grams of cane sugar were then added. The resulting product corresponded to a commercial pie filling formulation. Of course, other fruit juices could be used, but cranberry juice is a particularly severe test, because of its acidity. One portion of the composition was permitted to age at 40° F., for 8 weeks. Another portion was put through four freeze-thaw cycles, involving, as the name indicates, freezing the composition, permitting it to thaw, and freezing again, until four cycles had been completed.

At the same time I also put another composition through the above cold-aging test and freeze-thaw cycles. In this I made the cranberry cook-up, using as the starch one which had been treated with epichlorohydrin, as described in the first portion of this example, but which had received no subsequent treatment with propionic anhydride.

When the two samples were examined, after the above-described tests, it was found that the material wherein the starch had been treated only with epichlorohydrin had lost its clarity, having become dull and opaque, with a chunky texture, together with a good deal of syneresis ("watering-out"). On the other hand, the material which had been given the combination chemical treatment of this invention remained clear and transparent, with no deterioration in texture, and with no perceptible evidence of syneresis.

Example II 100 parts of waxy maize starch were suspended in 150 parts water, in which 0.8 part of sodium hydroxide had been dissolved. There was then slowly added 0.1 part of epichlorohydrin. After agitating for about 5 hours, the pH was then adjusted to 5.0, and the starch derivative was filtered, washed with water and resuspended in fresh water. Thereupon, the pH was adjusted to pH 7.0, by the addition of hydrochloric acid, and there were added 5 parts of acetic anhydride, in small portions. The pH was maintained at 7.0 during this addition, by simultaneous additions of sodium hydroxide solutions, as necessary. After addition of the anhydride had been completed, the pH of the reaction mass was adjusted to 5.0, and the starch was filtered, washed thoroughly with water and dried.

In a repetition of this example, all materials, proportions and procedures were the same as shown above, except that 10 parts of acetic anhydride were employed, rather than 5. In this case, the final product, when tested in the manner described in Example I, proved to be even more remarkably resistant to syneresis, loss of clarity or deterioration of texture upon prolonged aging at low temperatures or upon subjection to repeated freeze-thaw cycles.

Example III 100 parts tapioca starch were suspended in 125 parts water, in which 3.0 parts sodium carbonate had been dissolved. One part of phosphorous oxychloride was then added, dropwise, and the slurry agitated 12 hours. The pH was adjusted to 6.0 with hydrochloric acid and the starch filtered, washed, and resuspended in fresh water. Ten parts of acetic anhydride were added, in small portions, while maintaining the pH of the reaction mass at 7.5 by repeated additions of dilute (2%) potassium hydroxide solution. After all of the anhydride had been added, the starch was filtered, washed with water, and dried. When tested in the manner described in Example I, the product proved to be highly resistant to syneresis or loss of clarity and texture upon prolonged exposure to low temperatures.

Example IV

This example illustrates a variation in the process, wherein starch is treated with a mixture of a dibasic acid and an excess of acetic anhydride. It is believed that a mixed anhydride is formed between the dibasic acid and acetic anhydride, but regardless of whether such a mixed anhydride is formed, or whether the dibasic acid is present as a linear anhydride, it is seen that one has here a polyfunctional esterification reagent capable of reacting with the starch to cross-link the hydroxyl groups of the starch. This then is an equivalent of the phosphorous oxychloride or the epichlorohydrin of the previous examples, as a cross-linking reagent. At the same time, the excess of acetic anhydride reacts with the starch in the manner already described.

100 parts waxy sorghum starch were slurried in 145 parts water, and the pH raised to 9.0 with dilute (2½%) sodium hydroxide solution. While agitating the mixture vigorously, there were added 4 parts of a solution made by dissolving one part citric acid in 40 parts acetic anhydride. During this addition the pH of the mass was maintained at 9.0 by additions of dilute sodium hydroxide solution, as necessary. After all of the anhydride solution had been added, the pH was lowered to 5.0 by the addition of dilute hydrochloric acid, and the starch was filtered, washed thoroughly with water and dried. When tested in the manner described in Example I, the product proved to be highly resistant to syneresis and deterioration of clarity and texture, upon prolonged exposure to low temperatures.

Example V

Following the same principle illustrated in Example IV, I treated starch with a mixture of adipic acid and acetic anhydride. Here too, one has the cross-linking action of a polyfunctional esterification reagent (whether this be the linear anhydride of adipic acid or the mixed anhydride of adipic acid and acetic anhydride), together with the acylation effect of the acetic anhydride.

100 parts of waxy maize starch were suspended in 145 parts of water and the pH raised to 9.0 with dilute potassium hydroxide solution. With vigorous agitation, there were added 4.5 parts of a solution made by dissolving 1 part of adipic acid in 30 parts of acetic anhydride. The pH of the slurry was maintained at 9.0 during this addition by repeated addition of dilute potassium hydroxide solution, as necessary. After all of the anhydride solution had been added, the pH was lowered to 5.0 with dilute hydrochloric acid, and the starch filtered, washed and dried. When tested in the manner described in Example I, the starch product exhibited excellent resistance to syneresis and deterioration of clarity and texture upon prolonged exposure to low temperatures.

When the above example was repeated, except that I used 2 parts of sebacic acid (still another dibasic acid) in place of 1 part of adipic acid, a product of comparable properties was obtained.

Summerizing, it is seen that my invention makes possible the production of improved root-type starch (such as tapicoca, waxy maize or sorghum), whose aqueous dispersions are notably resistant to syneresis ("watering-out") or loss of clarity and deterioration of textures, upon subjection to prolonged periods of low temperature, or upon subjection to repeated freezing and thawing. This is of particular value in the use of such starches as ingredients of canned soups, pie fillings, frozen foods, thickeners and any other applications where starch is subjected to low-temperature storage. In this connection, it is to be noted that recent nutritional studies have resulted in the discovery that the quality of canned foods is best maintained if the cans are stored at temperatures of about 40°–60° F.; at higher temperatures there tends to be a loss in vitamin content and nutritional value. This lends added importance to the starch product of my invention, which can withstand prolonged low temperature storage.

In conducting the process, it is of course necessary to keep in mind the critical conditions hereinbefore set forth. Thus, the starch should be of the tuber or root-type, such as tapioca, waxy maize or waxy sorghum. The cross-linking agent must necessarily be polyfunctional, such for example as epichlorhydrin or phosphorous oxychloride. The proportions and the pH conditions should be kept within the limits previously described. In particular, one must avoid conditions of alkalinity and temperature which would cause the starch to gelatinize either during the reaction with the cross-linking reagent or with the acylating reagent. It is of course well known that excessive alkalinity or heat will cause starch to gelatinize, that is, to lose its granular structure and merge into a hydrated colloidal solution. This would make impossible the proper filtration and washing of the starch product at the end of the reaction, which is important when dealing with a food use.

On the other hand, many variations are possible, within the scope of the stated conditions. Other cross-linking agents may be preferred by the practitioner, or other alkaline materials for maintaining the pH values. At the end of the cross-linking reaction the starch may be filtered, washed and resuspended in water, or this step may be omitted and the acylating anhydride added directly (with the proper pH adjustment, as explained). The acylation treatment may in some cases precede the cross-linking reaction, or, as shown in Examples IV and V, the two reactions may be substantially simultaneous.

After the starch has been subjected to the cross-linking and acylation reactions, and has been filtered and washed, it may be dried and kept in the form of the ungelatinized granules until ready for use, at which time it may be dispersed, as by cooking in water or other desired medium. On the other hand, the product of this invention, in the form of the washed, ungelatinized starch granules, may be gelatinized, as by passing a water suspension of the starch product over a revolving heated drum. The dry product thus obtained will have the added characteristic of being cold water dispersible, without the need for cooking to bring it into dispersion. It is seen that the requirement for avoiding gelatinization refers to the conditions during the reaction, in order that the final product may be filtered and washed, but the ultimate product after purification may very well be deliberately gelatinized. These and other variations will be apparent to the practitioner, all coming within the scope of this invention as limited only by the claims hereof.

It is also understood that the practitioner when dealing with the preparation of food products will take all necessary steps to assure that the particular reagents he employs are non-toxic.

I claim:

1. A method for making a starch whose aqueous dispersions are characterized by improved stability and resistance to syneresis when exposed to prolonged storage at low temperatures, which comprises suspending an ungelatinized root-type starch in water, adding to said suspension a cross-linking reagent selected from the class consisting of cross-linking etherification and esterification reagents to react with hydroxyl groups of the starch and an acylation reagent selected from the class consisting of acetic and propionic acid anhydrides, and maintaining pH and temperature conditions such as to avoid gelatinization of the starch during the reaction with said cross-linking and acylation reagents, the amount of cross-linking reagent being from 0.05% to 1.0% and the amount of the acylation reagent being from 4% to 10%, based on the dry weight of the starch, and the ratio of cross-linking reagent to acylation reagent being within the range 1:10 to 1:100 by weight.

2. The method of claim 1 in which the root-type starch is selected from the class consisting of tapioca, potato, waxy maize and waxy sorghum starches.

3. The method of claim 1 in which the cross-linking etherification reagent is epichlorohydrin.

4. The method of claim 1 in which the cross-linking esterification reagent is phosphorous oxychloride.

5. The method of claim 1 in which the cross-linking esterification reagent is a mixed anhydride formed by the interaction of a polybasic acid selected from the class consisting of citric and adipic acids with an anhydride selected from the class consisting of acetic and propionic acid anhydrides.

6. The method of claim 1 in which the added reagents comprise a mixed anhydride formed by the interaction of a polybasic acid selected from the class consisting of citric and adipic acids with an excess of an anhydride selected from the class consisting of acetic and propionic acid anhydrides, the added reagents thus performing in a single step the functions of cross-linking and acylation of the starch.

7. The method of claim 1 in which the pH of the reaction mass is maintained within the range 9–12 during etherification and within the range 7–10.5 during esterification.

8. The method of claim 1 in which the starch, after reaction with the cross-linking and acylation reagents, is separated from the reaction mass and washed.

References Cited in the file of this patent

UNITED STATES PATENTS

| Re. 23,443 | Lolkema | Dec. 18, 1951 |
| 1,959,590 | Lorand | May 22, 1934 |
| 2,802,000 | Caldwell et al. | Aug. 6, 1957 |
| 2,853,484 | Lolkema et al. | Sept. 23, 1958 |